(12) United States Patent
Liu

(10) Patent No.: US 6,747,727 B2
(45) Date of Patent: Jun. 8, 2004

(54) METHOD FOR THE MANUFACTURE OF A LIQUID CRYSTAL DISPLAY

(76) Inventor: Hong-Da Liu, No.195, Sec. 4, Chung Hsing Rd., Chutung Town, Hsinchu Hsien (TW)

( * ) Notice: Subject to any disclaimer, the term of this patent is extended or adjusted under 35 U.S.C. 154(b) by 202 days.

(21) Appl. No.: 10/077,984

(22) Filed: Feb. 20, 2002

(65) Prior Publication Data

US 2002/0085144 A1 Jul. 4, 2002

Related U.S. Application Data

(63) Continuation-in-part of application No. 09/298,947, filed on Apr. 26, 1999, now abandoned.

(51) Int. Cl.$^7$ ............................ G02F 1/13; G02F 1/1337
(52) U.S. Cl. ......................... 349/187; 349/124; 349/129
(58) Field of Search ............................... 349/124, 129, 349/187, 158, 160; 430/5

(56) References Cited

U.S. PATENT DOCUMENTS

| | | | |
|---|---|---|---|
| 3,930,857 A | | 1/1976 | Bendz et al. ............... 430/313 |
| 4,536,059 A | * | 8/1985 | van den Berk ............. 349/168 |
| 4,693,559 A | * | 9/1987 | Baeger ....................... 349/160 |
| 5,111,240 A | | 5/1992 | Boettiger et al. ............. 355/53 |
| 5,252,415 A | | 10/1993 | Yoshizawa et al. ........... 430/31 |
| 5,596,618 A | | 1/1997 | Ogushi ........................ 378/34 |
| 5,648,860 A | | 7/1997 | Ooi et al. .................... 349/10 |
| 5,739,883 A | * | 4/1998 | Chen et al. ................. 349/124 |
| 5,777,713 A | | 7/1998 | Kimura ...................... 349/156 |
| 5,978,062 A | | 11/1999 | Liang et al. ................ 349/155 |
| 6,028,659 A | | 2/2000 | Kaneko ....................... 355/53 |
| 6,043,496 A | | 3/2000 | Tennant ..................... 250/492 |
| 6,087,274 A | | 7/2000 | Tonucci et al. ............. 438/758 |
| 6,187,486 B1 | | 2/2001 | Lai et al. ..................... 430/22 |
| 6,188,457 B1 | * | 2/2001 | Liu ............................ 349/124 |
| 6,236,445 B1 | | 5/2001 | Foschaar et al. ............ 349/156 |

OTHER PUBLICATIONS

K. Ismail, "A noel method for submicron structurization using optical projection lithography", Microelectronic Engineering vol. 1, No. 4, pp. 295–300 (1983).

M.J. Cole et al., "Moving fiber/phase mask–scanning beam technique for enhanced flexibility in producing fibre gratings with uniform phase mask", Electronic Letter, 17th Aug. 1995, vol. 31, No. 17, pp. 1488–1490 (1995).

O. Tabata et al., "Moving mask Liga (M$^2$LIA) process for control of side wall inclination", Micro–Electro Mechanical System, 1999, MEMS 1999, The 12$^{th}$ IEEE International Conference, pp. 252–256 (1999).

* cited by examiner

*Primary Examiner*—Tarifur R. Chowdhury
(74) *Attorney, Agent, or Firm*—McDermott, Will & Emery

(57) ABSTRACT

The method uses one photomask and one-exposure steps wherein said photomask comprising two major portions that are formed by mirror image with each other, the wides of openings formed in said photomask being increased from a central portion to an edge portion, the spaces between two adjacent said openings being decreased from said central portion to said edge. Then, shift said substrate with a distance to a direction perpendicular to a surface of said photomask. Next, expose said photosensitive material layer by using said photomask; and developing the photosensitive material to form said bump structure.

12 Claims, 6 Drawing Sheets

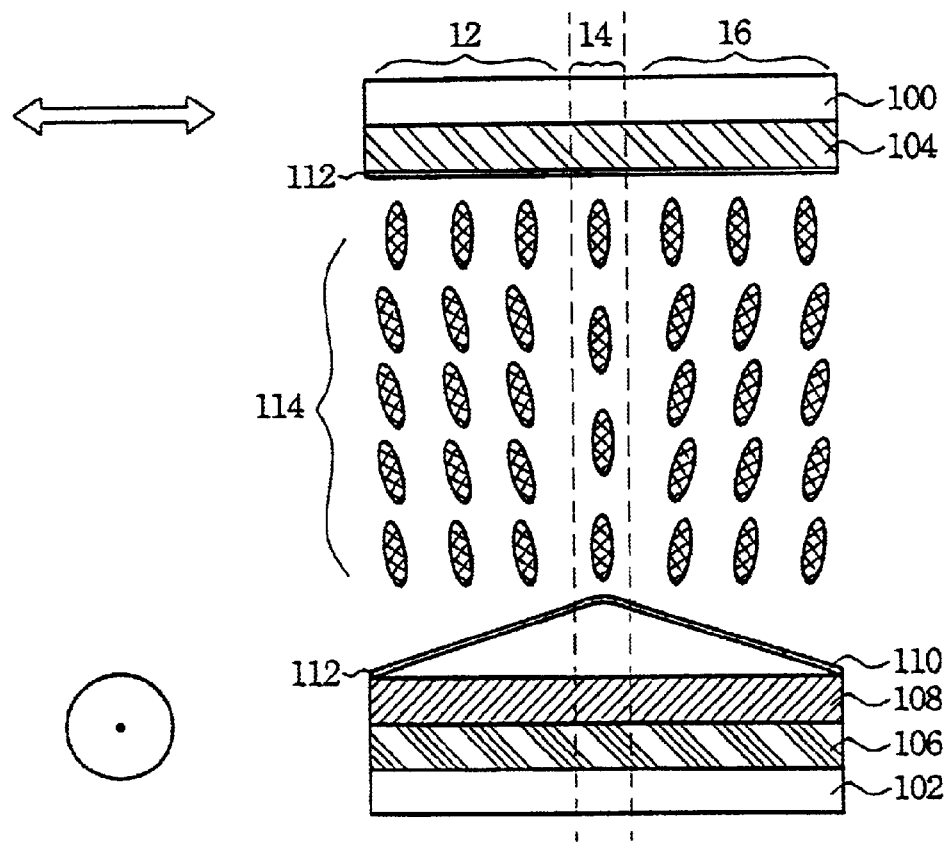
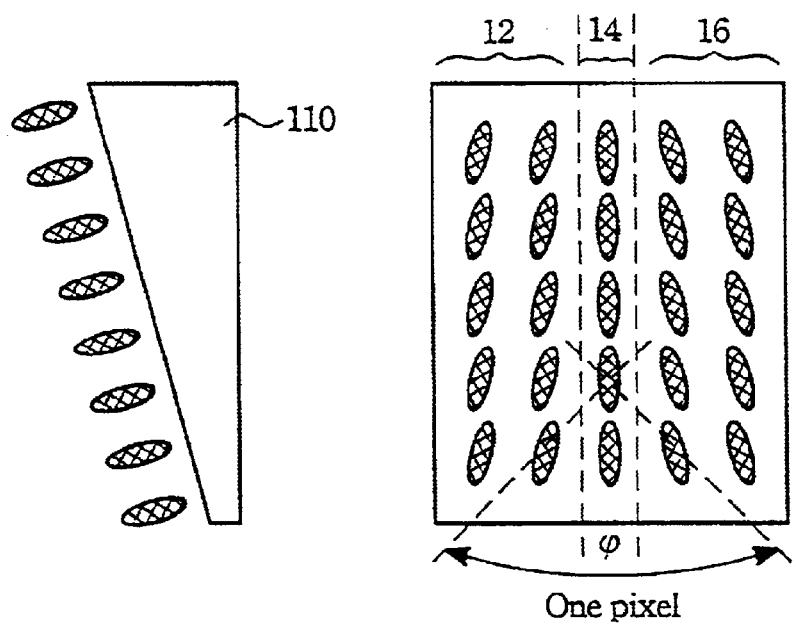
FIG.1
FIG.3    FIG.2

| i | 1 | 2 | 3 | 4 |
|---|---|---|---|---|
| Mi | 15 | 8 | 6 | 3 |
| Ti | 4 | 5 | 8 | 11.5 |

I=0u

METHOD FOR THE MANUFACTURE OF A LIQUID CRYSTAL DISPLAY

CROSS REFERENCE TO RELATED APPLICATION

This following copending U.S. patent application assigned to the assignee of the present invention is related to the present invention. Ser. No. 09/009,184 filed Jan. 20, 1998 and entitle "WIDE VIEWING ANGLE LIQUID CRYSTAL DISPLAY".

The invention is a continuous in part of the application filed on Apr. 26, 1999, with an application Ser. No. 09/298,947, now abandoned, under the same title assigned to same assignee.

FIELD OF THE INVENTION

The present invention relates to a method of making liquid crystal display (LCD), and more specifically, to a method of forming a LCD with a wide viewing angle.

BACKGROUND OF THE INVENTION

Recently, personal data assistant (PDA) and notebook are remarkably progressing. The demanded requirements of the displays for portable use are light weight and low power consumption. Thin film transistor-liquid crystal display (TFT-LCD) can meet the above requirements and is known as the display required for the high pixel density and quality. In general, the TFT-LCD includes a bottom plate formed with thin film transistors and pixel electrodes and a top plate formed with color filters. The liquid crystal is filled between the top plate and the bottom plate. In each unit pixel, a capacitor and a further capacitor are provided which are formed by virtue of the TFT serving as the switching element of the unit pixel. When the data voltage is applied to the TFT, the arrangement of the liquid crystal molecules is change, thereby changing the optical properties and displaying the image.

In general, the viewing angle and the color performance are very important issues for the design of the LCD. A color filter (CF) plate is used in the LCD to show the colored portion of the screen. One of the trends for the LCD technology is to improve the viewing angle of the LCD. However, the viewing angle and contrast ratio of LCD are still insufficiently applied to products having large screen. One of an article relating to a vertical-alignment-mode LCD can be seen in SID'97 DIGEST p845~p848, proposed by K. Ohmuro, S. Kataoka, T. Sasaki and Y. Koike. In the reference, the VA-LCD (vertically aligned LCD) has been implemented by optimizing a vertically aligned mode with a domain-divided structure and an optical compensator. This vertical-alignment-mode LCD has a wide viewing angle over 70°, a fast response (<25 ms), and a high contrast ratio of over 300. However, it still suffers some drawbacks. For example, the formation of the two-domain structure needs the mask rubbing process, which is complicated and expensive. The rubbing process also produces ESD (Electrostatic Discharge) problem and particles. In addition, the mask rubbing will lead to a result of image sticking.

SUMMARY OF THE INVENTION

An object of the present invention is to provide a method of forming a LCD with wide viewing angle.

Another object of the present invention is to form a bump structure in LCD cell, thereby increasing the pre-titled angle of the liquid crystal molecules.

The present invention includes a pair of light polarizers consisting of a polarizer and an analyzer. An upper transparent insulating substrate is formed under the polarizer. A compensator is formed on the analyzer. A bump structure is formed above the lower substrate. The liquid crystal molecules have larger pre-titled angle that are formed on the bump structure having predetermined lending directions. The method of forming the bump structure is seen as follows.

The method uses one photomask and one-exposure steps wherein said photomask comprising two major portions that are formed by mirror image with each other, the wides of openings formed in said photomask being increased from a central portion to an edge portion, the spaces between two adjacent said openings being decreased from said central portion to said edge. Then, shift said substrate with a distance to a direction perpendicular to a surface of said photomask. Next, expose said photosensitive material layer by using said photomask; and developing the photosensitive material to form said bump structure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is cross sectional view of a liquid crystal display (LCD) in accordance with the present invention.

FIG. 2 is a top view of a liquid crystal display in accordance with the present invention.

FIG. 3 is a side view of a liquid crystal display in accordance with the present invention.

DETAILED DESCRIPTION OF THE PREFERRED EMBODIMENTS

Figure 4:
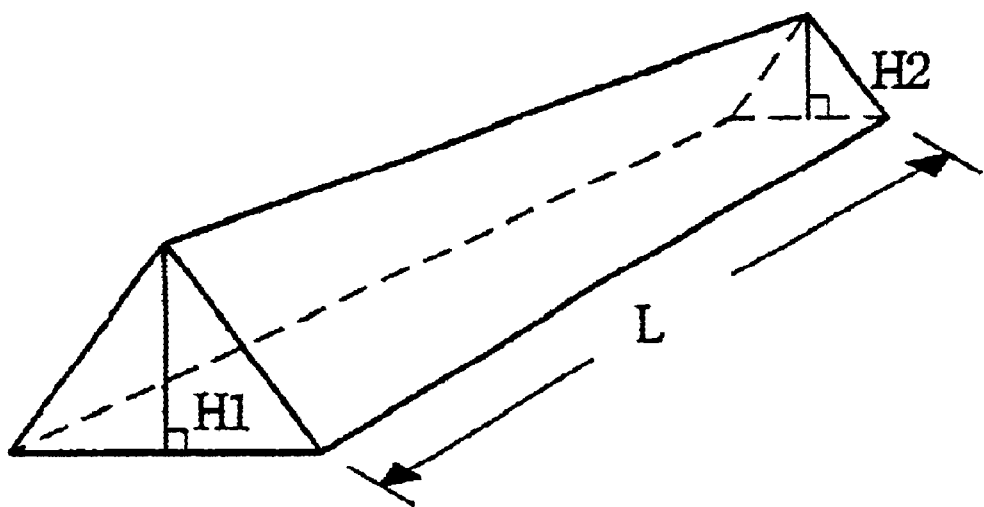
FIG. 4 is a scheme illustrating a bump structure in accordance with the present invention.

The present invention will be described in detail with reference to drawings. The present invention is to provide a method of increasing viewing angle on a two-domain Chiral Homeotropic LCD with negative compensator. A bump structure is employed in the present invention to achieve aforesaid ourpose. The detail processes will be described as follows.

FIG. 1 is a scheme showing a panel structure of an UV-type (UltraViolet-type) two-domain Chiral Homeotropic LCD with negative compensator. The liquid crystal display includes a pair of light polarizers consisting of a polarizer 100 and an analyzer 102. The polarizer and analyzer 102 are arranged such that the optic axes of the pair of polarizers are with each other. That is, in the absence of anything else between them, light passing through the polarizer 100 would be blocked by the analyzer 102, and vice versa. An upper transparent insulating substrate 104, such as glass or the like,) is formed under the polarizer 100. A negative compensator 106 is formed on the analyzer 102. The negative compensator 106 is used to reduce the viewing-angle dependence light leakage. A lower substrate 108 is located above the negative compensator 104 The lower substrate 106 is composed of transparent insulating material such as glass that is similar to the upper substrate 104. Transparent conductive lines (not shown) including indium tin oxide (ITO) thin films run orthogonal to one another and are located on the bottom surface of upper substrate 104 and the top surface of the lower substrate 108, respectively. A bump structure 110 is formed at least one of said pair of glass substrate. FIG. 1 shows that the bump structure 110 is formed above the lower substrate 108. The detailed description of the bump structure 110 will be seen later.

Two orientation layers 112 are respectively coated on the surfaces of the upper substrate 104 and the bump structure 110. In general, the function of the layers is to control the orientation of the liquid crystal molecules. The orientation layers 112 is formed by a LPUV (Linearly-Polarized Ultra-Violet) process. This is well known in the art and not the feature of the present invention, the detailed description will not be given. Liquid crystal material 114 is filled and confined between the upper substrate 104 and the lower substrate 108. Preferably, the liquid crystal material 114 is formed of Chiral Homeotropic liquid crystal molecules. The Chiral Homeotropic liquid crystal molecules together with substrates to form a vertical aligned cell 10.

The liquid crystal molecules 114 are chiral nematic orientated, and there are two domains 12, 16 with an overlap region 16 formed between the domains 12, 16 in one pixel. The tilt direction (azimuthal) of liquid crystal molecules in the overlap region 14 has a angle φ that is not equal to 90 degrees (it can be greater or less than 90 degrees) with respect to the tilt direction of the liquid crystal molecules in domains 12 and 16.

In ON state, the color dispersion is small due to the liquid crystal molecules are chiral nematic orientated. The present invention also features the advantage of large grayscale viewing angle with no inversion. Referring to FIG. 2, it shows a fragmentary top view of the two-domain VA(Vertical Aligned) mode LCD with negative compensator. The tilt angle φ that project on the azimuthal of substrate between the orientation of liquid crystal molecules in domains 12 and 14 are not equal to 180 degree (it can greater or less than 180 degree). In this embodiment, the liquid crystal molecules in each domain are orientated nearly perpendicular to the surface of substrates with a little pre-tilted angle to the normal of the substrates when an electrode field is not applied (OFF state). The tilt-angle of the liquid crystal molecules that project on the azimuthal of the substrate between the orientation of liquid crystal molecules in two domains is not equal to 180 degree.

The pre-tilted angle of the two-domain vertical aligned liquid crystal molecules in domains 12, 14 and the overlap area 16 before the ON state strongly effects the response time of the liquid crystal molecules. The bump structure 110 according to the present invention is used for further achieving this response characteristic of domain divided VA-cells. FIG. 3 is the side view of the bump structure 110, and the FIG. 4 is a scheme illustrating the three-dimension picture of the bump structure 110. The bump structure 110 can be formed of positive or negative photoresist. Preferably, the bump structure 110 is configured so that the top surface of the structure lends to a desire direction, thus the liquid crystal molecules formed over the bump structure 110 has a larger pre-titled angle. For example, the bump structure 110 is constructed by two side surfaces 18, 20 and two inclined surfaces 22. The side surfaces 18, 20 of the bump structure are configured as a triangle shape. In the preferred embodiment, the side surfaces 18, 20 are formed with different height H1 and H2 such that the inclined surfaces 22 of the bump structure 110 will lean to a desired direction due to H1 higher than H2. The terminals of each inclined surfaces 22 connect to the side surfaces 18, 20, respectively. The oblique angle of the inclined surface 22 from the surface of the substrate indicated by angle a is about 0.5 to 3 degrees.

Figure 5:
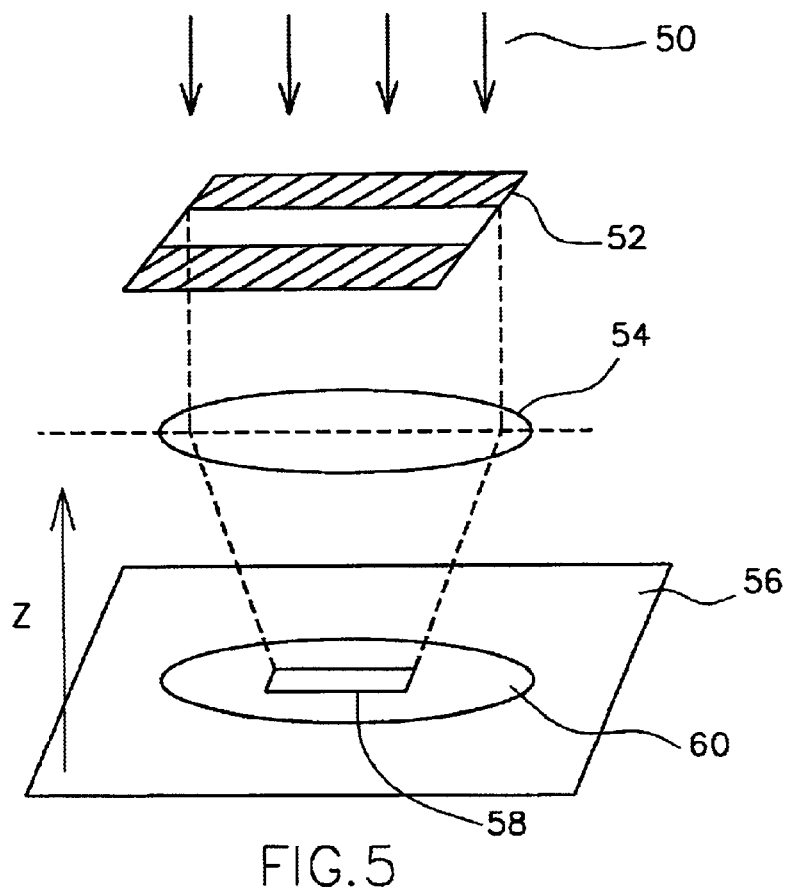
FIG. 5 is a schematic representation of a conventional wafer stepper.

FIG. 5 to FIG. 10 shows a preferred embodiment of the present invention. Referring to FIG. 5, it is a schematic representation of a conventional wafer stepper. Such a wafer stepper can be used to practice the embodiment of the present invention. The substrate 30 whose surface is deposited a photosensitive material (not shown in the figure) used as a photo resist layer is supported by a table 56. The UV-light 50 passes the photo mask 52 and the optical lens 54 to illuminates the substrate 60 which can transfer the photo mask 52 image to the substrate 60.

It can be known that the focus and exposure energy may affect the photo resist image after photolithography, therefore, this embodiment utilizes this characteristic to build the bump structure. The photo mask 30 shown in FIG. 6A can be used to practice this embodiment of the present invention. The photo mask 30 is divided two major portions that are mirror image with each other. The width of the openings of the photo mask 30 are increased from the central portion to the edge portion. That is the wide T4 is wider than the wide T3 that is wider than the wide T2, the T2 is also wider than T1. Furthermore, the spaces (oblique line region) between two adjacent openings is decreased from the central portion to the edge portion, namely, the space M1 is wider than M2 that is wider than M3. The space M3 is wider than M4. The L represents the distance between the oblique line region and the edge of the photo mask 30.

When using this photo mask 30 in the wafer stepper, the illumination energy of the UV light 50 in the substrate will different due to the interfere, which will result in the different depth of the photo resist after photolithography. In accordance with the design of the photo mask 30, the openings of the photo mask 30 are increased from the central portion to the edge.

Figure 6A:
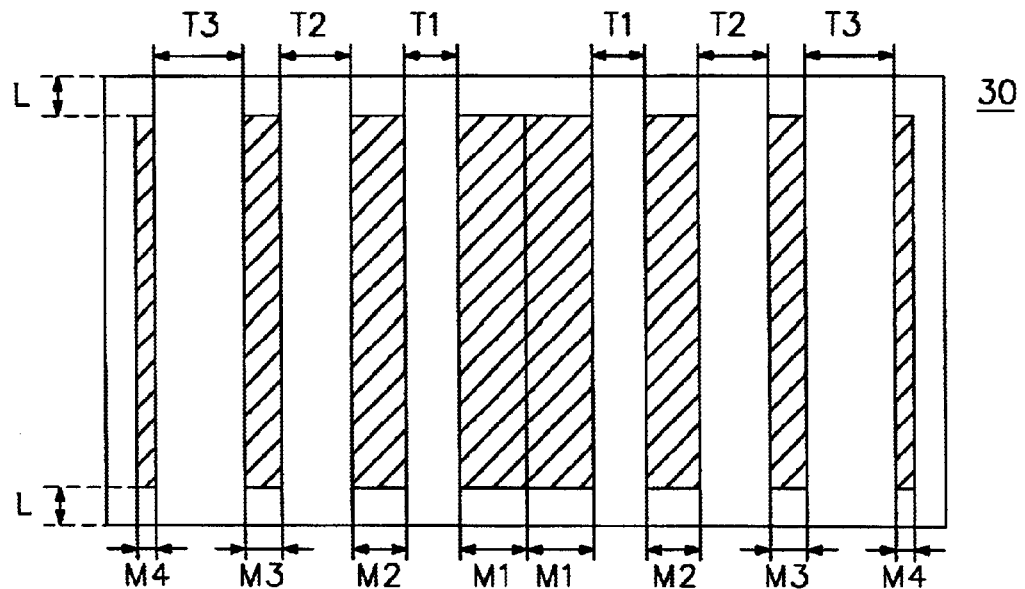
FIG. 6 is a top view of a photo mask used in the present invention.
Figures 6B, 7:
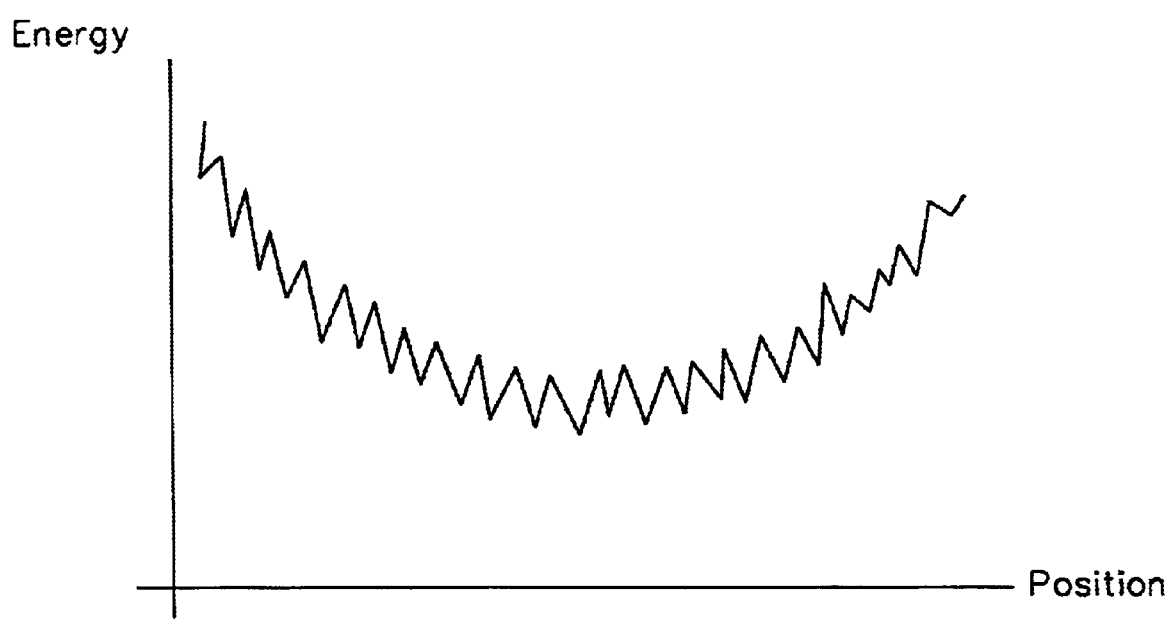
FIG. 7 is a illumination energy distribution drawing.

FIG. 6B shows a scale table of the photo mask 30, wherein the "i" is from 1 to 4. The distance between the oblique line region and the edge of the photo mask 30 is 0 $\mu$m. The Ti is the width of the opening. In accordance with this preferred embodiment the Ti width is located between 4 $\mu$m to 11.5 $\mu$m. Furthermore, the Mi is the width between two adjacent openings. In accordance with this preferred embodiment the space Ti width is located between 3 $\mu$m to 15 $\mu$m. Therefore, the illumination energy is typically decreased from edge to center portion so that the depth of the photo resist after photolithography is increased from edge portion to center portion.

However, because of the typically focus point always locates on the surface of the substrate, the illumination energy distribution will not smooth because of diffraction. The FIG. 7 shows the illumination energy distribution. The non-smooth illumination energy will cause the depth variation. Therefore, the main characteristic of this embodiment is to provide a solution method. This method utilize to modify the distance between the photo mask 30 and the substrate 60 to modify the diffraction situation.

Figure 8:
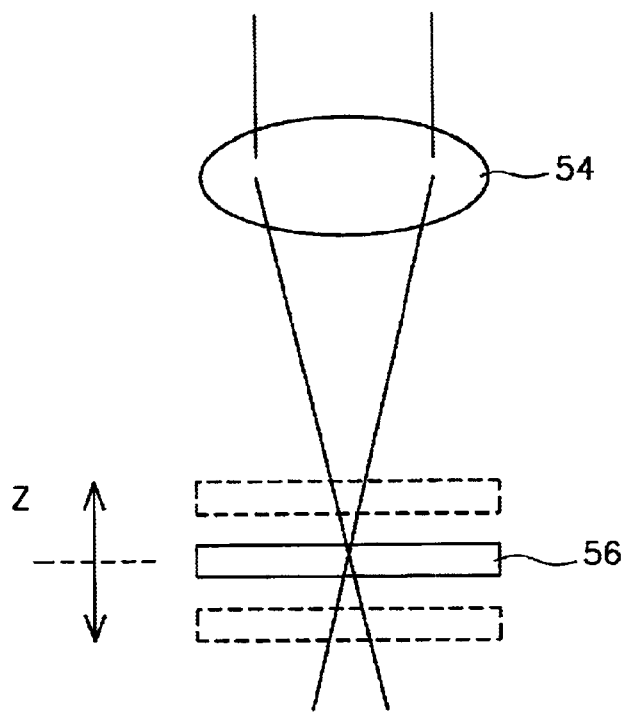
FIG. 8 is a portion lateral view of a conventional wafer stepper.
Figure 9:
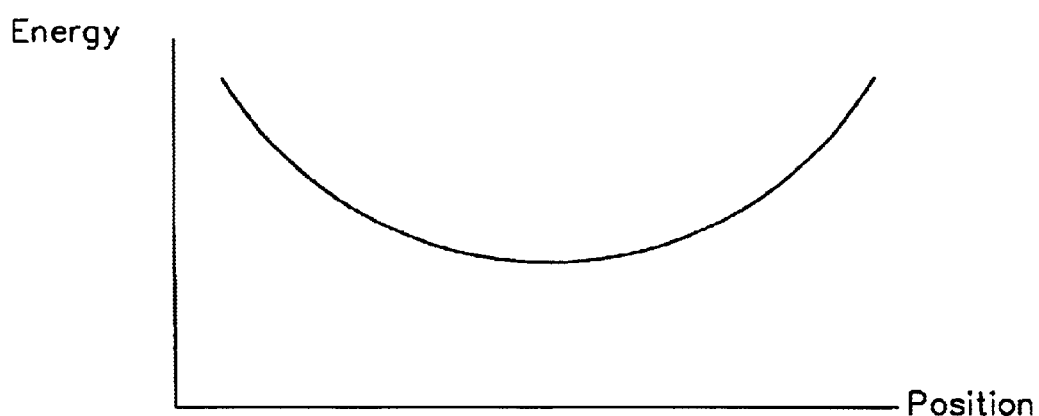
FIG. 9 is a illumination energy distribution drawing according to the present invention.

A movable table 56 is designed in this embodiment to change the focus position, which means, the table is movable in the Z direction as shown in FIG. 5. The FIG. 8 is the portion lateral view of the FIG. 5, wherein the table may be moved up or down until the best "diffraction situation" is found. The best "diffraction situation" means to find the smooth illumination energy distribution as shown in the FIG. 9. In accordance with this preferred embodiment, the modification distance is about between 0 μm to ±10 μm. It is noticed that the different photo mask design may affect the modification distance. It will be appreciated that various changes, such as the different design of the photomask, can be made therein without departing from the spirit and scope of the invention.

Figure 10:
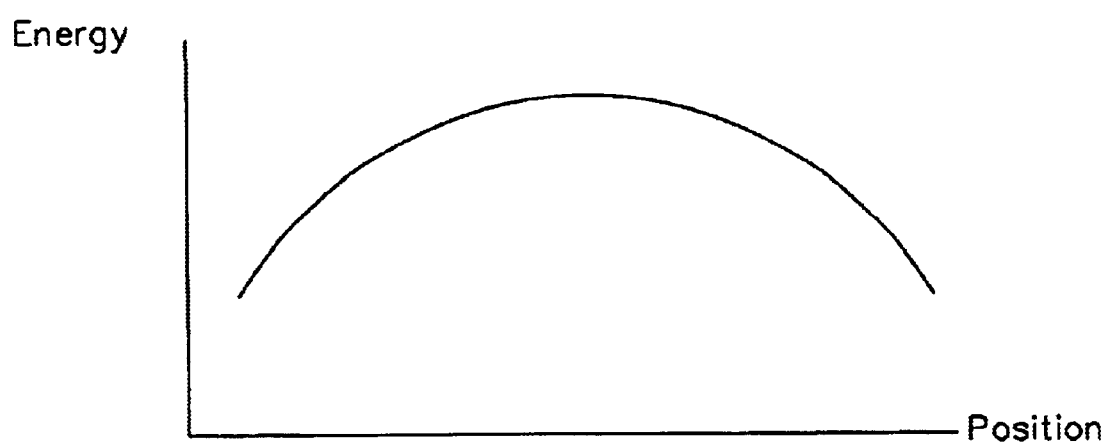
FIG. 10 is a cross sectional views of the bump structure in accordance with the present invention.

When the smooth illumination energy is used in a positive photo resist, after photolithography, a smooth bump structure of the positive photo resist will be formed as shown in the FIG. 10. Because of the illumination energy typically decreased from edge to center portion so that the bump structure of the positive photo resist after photolithography is increased from edge portion to center portion.

The steps according to above can be described as follows.

(a) using a photomask to expose a photosensitive material layer deposited on the surface of a substrate, wherein said photomask comprising two major portions that are formed by mirror image with each other, the wides of openings formed in said photomask being increased from a central portion to an edge portion, the spaces between two adjacent said openings being decreased from said central portion to said edge.

(b) shifting said substrate to a direction perpendicular to a surface of said photomask;

(c) exposing said photosensitive material layer by using said photomask; and (d) developing the photosensitive material.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a bump structure, said method comprising:

(a) using a light to pass through a photomask to expose a photosensitive material layer deposited on the surface of a substrate, wherein said photomask comprising two major portions that are formed by mirror image with each other, the wides of openings formed in said photomask being increased from a central portion to an edge portion, the spaces between two adjacent said openings being decreased from said central portion to said edge, and a diffraction situation being generated when said light passing through said photomask;

(b) shifting said substrate with a distance to a direction perpendicular to a surface of said photomask;

(c) exposing said photosensitive material layer by using said photomask; and (d) developing the photosensitive material to form said bump structure.

2. The method of claim 1, wherein said light is an UV light.

3. The method of claim 1, wherein the width of said openings is about 0.5 μm to 12 μm.

4. The method of claim 1, wherein the said space between two adjacent said openings is about 0.5 μm to 15 μm.

5. The method of claim 1, wherein said distance may smooth said diffraction situation.

6. The method of claim 1, wherein said distance is about 0 μm to ±10 μm.

7. A method of forming a liquid crystal display, said method comprising:

providing a pair of light polarizers;

forming a compensator on one of said pair of light polarizers;

forming a pair of transparent insulating substrate on said compensator and on other one of said pair of light polarizers;

forming bump structures on at least one of said pair of transparent insulating substrate by following steps:

(a) using a light to pass through a photomask to expose a photosensitive material layer deposited on the surface of a substrate, wherein said photomask comprising two major portions that are formed by mirror image with each other, the wides of openings formed in said photomask being increased from a central portion to an edge portion, the spaces between two adjacent said openings being decreased from said central portion to said edge, and a diffraction situation being generated when said light passing through said photomask;

(b) shifting said substrate with a distance to a direction perpendicular to a surface of said photomask;

(c) exposing said photosensitive material layer by using said photomask; and (d) developing the photosensitive material to form said bump structure, forming orientation layers over said pair of transparent insulating substrate and over said bump structures; and providing liquid crystal molecules between said pair of transparent insulating substrate.

8. The method of claim 7, wherein said light is an UV light.

9. The method of claim 7, wherein the width of said openings is about 0.5 μm to 12 μm.

10. The method of claim 7, wherein the said space between two adjacent said openings is about 0.5 μm to 15 μm.

11. The method of claim 7, wherein said distance may smooth said diffraction situation.

12. The method of claim 7, wherein said distance is about 0 μm to ±10 μm.

* * * * *